United States Patent
Endo et al.

(10) Patent No.: US 8,367,201 B2
(45) Date of Patent: Feb. 5, 2013

(54) CHROMIUM-FREE RUST-INHIBITIVE SURFACE TREATMENT AGENT FOR METAL PARTS WITH ZINC SURFACES AND METAL PARTS WITH ZINC SURFACES COATED WITH RUST-INHIBITIVE SURFACE COATED FILM

(75) Inventors: Yasuhiko Endo, Yokohama (JP); Hideaki Nogami, Urayasu (JP); Shunjiro Watanabe, Yatomi (JP); Shoichiro Adachi, Ogaki (JP); Yukiyasu Kang, Kaizu (JP)

(73) Assignee: Hoden Seimitsu Kako Kenkyusho Co., Ltd., Atsugi-Shi, Kanagawa (JP)

( * ) Notice: Subject to any disclaimer, the term of this patent is extended or adjusted under 35 U.S.C. 154(b) by 1003 days.

(21) Appl. No.: 12/282,979

(22) PCT Filed: Apr. 13, 2007

(86) PCT No.: PCT/JP2007/058137
§ 371 (c)(1),
(2), (4) Date: Sep. 15, 2008

(87) PCT Pub. No.: WO2007/119812
PCT Pub. Date: Oct. 25, 2007

(65) Prior Publication Data
US 2009/0169875 A1 Jul. 2, 2009

(30) Foreign Application Priority Data

Apr. 18, 2006 (JP) ................... 2006-114099

(51) Int. Cl.
*B32B 5/00* (2006.01)
*C08K 3/00* (2006.01)

(52) U.S. Cl. ........ 428/336; 428/628; 428/201; 428/621; 428/364; 428/369; 428/370; 428/371; 428/375; 428/379; 428/332; 428/624; 428/418; 428/447

(58) Field of Classification Search .................. 428/336, 428/628, 201, 621, 364, 369, 370, 371, 375, 428/379, 332, 447, 418, 624
See application file for complete search history.

(56) References Cited

U.S. PATENT DOCUMENTS

| | | | |
|---|---|---|---|
| 2004/0137238 A1 | 7/2004 | Clerici et al. | |
| 2005/0037227 A1 | 2/2005 | Endo et al. | |

FOREIGN PATENT DOCUMENTS

| | | | |
|---|---|---|---|
| JP | 03-239774 | * | 2/1990 |
| JP | 03-020377 A | | 1/1991 |
| JP | 03-239774 A | | 10/1991 |
| JP | 05-179201 A | | 7/1993 |
| JP | 07-157715 | * | 6/1995 |
| JP | 07-157715 A | | 6/1995 |
| JP | 2003-160759 A | | 6/2003 |
| JP | 2004-527626 A | | 9/2004 |
| JP | 2004527626 T | * | 9/2004 |
| JP | 2005-097719 A | | 4/2005 |
| JP | 2005-264170 | * | 9/2005 |
| JP | 2005-264170 A | | 9/2005 |
| JP | 2006-225761 A | | 8/2006 |

* cited by examiner

Primary Examiner — Robert D. Harlan
(74) Attorney, Agent, or Firm — Sughrue Mion, PLLC

(57) ABSTRACT

Disclosed is a chromium-free rust-inhibitive surface treatment agent to form a siliceous film that rarely cracks or peels off and yields an excellent rust-inhibitive performance on zinc surfaces of a metal part. The chromium-free rust-inhibitive surface treatment agent is an alcoholic solution of alkoxysilane oligomer having weight-averaged molecular weight of 1,000 to 10,000, and 2.5 to 15% of silicon in molecules of the alkoxysilane oligomer has been replaced with titanium. To prepare partly titanium-replaced alkoxysilane oligomer, titanium compound, in which about a half of alkoxy groups in titanium tetraalkoxide has been chelated, is reacted with tetraalkoxysilane monomer or alkoxysilane oligomer in the alcoholic solution.

11 Claims, No Drawings

CHROMIUM-FREE RUST-INHIBITIVE SURFACE TREATMENT AGENT FOR METAL PARTS WITH ZINC SURFACES AND METAL PARTS WITH ZINC SURFACES COATED WITH RUST-INHIBITIVE SURFACE COATED FILM

CROSS REFERENCE TO RELATED APPLICATIONS

This application is a National Stage of PCT/JP2007/058137 filed Apr. 13, 2007, claiming priority based on Japanese Patent Application No. 2006-114099, filed Apr. 18, 2006, the contents of all of which are incorporated herein by reference.

TECHNICAL FIELD

The present invention relates to a chromium-free rust-inhibitive surface treatment agent used for preventing the generation of white rust and red rust on metal parts with zinc surfaces such as galvanized bolts and nuts, and to metal parts with zinc surfaces coated with a rust-inhibitive surface coated film.

BACKGROUND ART

RoHS regulation has come into effect in the Europe, and the use of surface treatment agents containing a hexavalent chromium component such as chromate treatment (surface treatment using hexavalent chromium components) provided for imparting rust inhibitive performance on zinc surfaces has been restricted. Along with the regulation, chromite surface treatment performed for galvanized metal parts has become widespread instead of chromate treatment in industrial fields. However, the chromite treatment has some problems. For example, there are problems that it is difficult to control treatment solutions; the renewal life of treatment solutions is short; and the friction coefficient on the surface of galvanized metal parts subjected to chromite treatment is large. It is necessary to further apply a surface treatment agent for adjusting a friction coefficient in fastener parts such as some galvanized bolts and nuts. In addition, the rust inhibitive performance of galvanized products subjected to chromite surface treatment is inferior to that of galvanized products subjected to conventional chromate treatment, and sometimes relaxation of the rust inhibitive specification required for galvanized parts has also been conducted.

Further, it cannot be prevented that some trivalent chromium is converted into hexavalent chromium by an equilibrium reaction and significant amounts of hexavalent chromium components are detected in the conversion film. For this reason, it is considered that the chromite surface treatment method is a temporary surface treatment method and should be changed to a completely chromium-free surface treatment method in the near future.

Many treatment methods have so far been proposed for completely chromium-free surface treatment. However, in galvanized metal parts provided with a thin coated film obtained by chromium-free surface treatment which is equivalent in thickness to that obtained by chromate treatment, the rust-inhibitive performance has not yet reached the practical use. In the case of applying top coating, the surfaces of galvanized metal parts should be subjected to chromium-free surface treatment with a film having a thickness exceeding 10 μm to achieve the required rust-inhibitive performance. However, there is no chromium-free rust-inhibitive surface treatment only with thin coated films for galvanized metal parts showing rust-inhibitive performance which is not inferior to that obtained by chromate treatment, except for the chromium-free rust-inhibitive surface treatment which the present inventors have previously proposed.

In Patent Document 1, the present inventors have proposed a chromium-free rust-inhibitive surface treatment agent which is applied onto the surfaces of galvanized metal parts to form a thin siliceous film which can suppress the generation of red rust for a long period of time. Nano-sized powders of titanium oxide which are subjected to dispersion treatment and have an averaged primary particle size of 70 nm or less have been blended in an effective amount in the chromium-free rust-inhibitive surface treatment agent.

Further, in Patent Document 2, the present inventors have proposed a chromium-free rust-inhibitive surface treatment agent for zinc surfaces composed mainly of an alcoholic solution of alkoxysilane oligomer having a specific weight-averaged molecular weight. When the chromium-free rust-inhibitive surface treatment agent is applied onto the zinc surfaces of galvanized products and the like to form a thin siliceous film, the generation of white rust can be suppressed for a long period of time.

In utilizing the chromium-free rust-inhibitive surface treatment agent composed mainly of an alcoholic solution of alkoxysilane oligomer, when galvanized metal parts are subjected to an activation treatment in which the metal parts are immersed in a diluted aqueous nitric acid solution (a pickling process performed as pre-treatment of chromate treatment) and then subjected to chromium-free surface treatment, the rust-inhibitive performance is poor in many cases. For this reason, galvanized metal parts not subjected to nitric acid activation treatment (pickling) are water-rinsed and dried, and then they are subjected to chromium-free rust-inhibitive surface treatment.

Further, when the chromium-free rust-inhibitive surface treatment agent composed mainly of an alcoholic solution of alkoxysilane oligomer is applied onto as-galvanized bolts (without chromate treatment) obtained from several galvanizers, there is a problem that the rust-inhibitive performance in the generation of white rust is greatly changed depending on which galvanized bolt is applied.

As a method which can prevent this problem, in Patent Document 3, the present inventors have proposed rust-inhibitive treatment in which metal parts are previously subjected to chromium-free conversion coating and then applied with a chromium-free rust-inhibitive surface treatment agent composed mainly of an alcoholic solution of alkoxysilane oligomer. However, the surface treatment needs to add at least one treatment process and therefore cannot satisfy the request of users who wish to perform surface treatment in a simple process.

Thereafter, when galvanized metal parts such as bolts are applied with this chromium-free rust-inhibitive surface treatment agent and the coated metal parts are stored for about 1 year, there arises a problem that: crazing occurs in the coated film; a phenomenon that crazing occurs in the coated film and subsequently the film is peeled off in some portion where a little thick coated film (3 μm or more) is applied; and white powders are observed on the galvanized surface and it seems as if white rusting is generated.

Patent Document 4 has not mentioned rust-inhibitive performance, but has disclosed a coating composition in which an alkoxysilane is hydrolyzed by adding an acid catalyst and water and condensation-polymerized while evaporating alcohol and water. The every alkoxysilane used as a raw material of the coating composition in Examples is an alkylalkoxysilane. In addition, it is described that a chelate compound of zirconium, titanium or aluminum is blended into this composition. However, there is an example in which a zirconium chelate compound is blended (see Example 7 in the same Patent Document 4), but there is no example in which an organic chelate titanium compound is blended or there is no example in which metal parts with zinc surfaces are coated.

Further, Patent Document 5 has disclosed a silica-based protection coating solution in which an alkoxysilane and a titanium alkoxide are hydrolyzed in an alcoholic solution using acetic acid as a catalyst and then condensation-polymerized. In the examples, examples of an object to be protection-coated include CFRP (carbon fiber reinforced plastics) in addition to metal parts such as titanium. In addition, as the alkoxysilane used as a raw material of a protection coating solution, an alkoxysilane having an epoxy functional group and an alkoxysilane having an amino group (exhibiting basicity) are used. Since an amino group functions as a basic catalyst for proceeding with a cross-linking reaction between alkoxysilane oligomer molecules in the solution, there is a disadvantage that the solution is apt to gelated. In Example 4 in the same Patent Document 5, after the protection coating solution is applied onto a hot-dip galvanized steel plate using a mixed coating solution of alcohol and water, the adhesion of the coated film to the substrate is evaluated, but the rust-inhibitive performance is not examined.

Patent Document 1: JP 2005-097719 A
Patent Document 2: JP 2005-264170 A
Patent Document 3: JP 2006-225761 A
Patent Document 4: JP 07-157715 A
Patent Document 5: JP 2003-160759 A

DISCLOSURE OF THE INVENTION

Problems to be Solved by the Invention

There are some problems in the previously proposed chromium-free rust-inhibitive surface treatment agent composed mainly of an alcoholic solution of alkoxysilane oligomer. Particularly, when metal parts galvanized in various different conditions are subjected to surface treatment with the previously proposed chromium-free rust-inhibitive surface treatment agent, the satisfactory rust-inhibitive performance cannot be obtained in some cases. Further, as moisture in the air is incorporated into the solution, a small amount of dispersion-treated nano-sized powders of titanium oxide which is blended for enhancing rust-inhibitive performance tends to be agglomerated. When a surface treatment agent containing the agglomerated nano-sized powders of titanium oxide is applied onto a zinc surface of a metal part to form a coated film, the surface becomes a little whitish, and it seems as if white rust is generated. In addition, as a phenomenon intrinsic to a coated film formed by a sol-gel method, when the applied coated film is baked after drying, tensile stress is generated in the resulting coated film along with evaporation of a solvent, and thereby crazing occurs in the coated film by this stress. The coated film tends to be peeled off in the portion where crazing occurs with the lapse of time if a little thick portion is present in the coated film. When the coated film is peeled off, it forms white powders, and it seems as if white rust is generated on the surface of the metal part, and thereby the rust-inhibitive performance in the portion is reduced.

The present invention has an object to provide a chromium-free rust-inhibitive surface treatment agent which resolves problems of the previously proposed chromium-free rust-inhibitive surface treatment agent composed mainly of an alcoholic solution of alkoxysilane oligomer to improve rust-inhibitive performance.

That is, the object of the present invention is to provide a chromium-free rust-inhibitive surface treatment agent having further improved rust-inhibitive performance which is able to impart rust-inhibitive performance for practical use to even galvanized parts that is formerly difficult to impart rust-inhibitive performance for practical use and has a poor affinity with a surface treatment agent; and in which crazing or peeling off hardly occurs to the formed rust-inhibitive coated film.

Means for Solving the Problems

A chromium-free rust-inhibitive surface treatment agent for metal parts with zinc surfaces of the present invention consists of an alcoholic solution of alkoxysilane oligomer having weight-averaged molecular weight (Mw) of 1,000 to 10,000, wherein silicon atoms in molecules of the alkoxysilane oligomer are partly replaced with titanium atoms from an organic chelate titanium compound, the alcoholic solution contains titanium of 2.5 to 15 atomic % to a total amount of silicon and titanium, and the total amount of silicon and titanium is 5 to 20 weight % in the alcoholic solution when silicon and titanium are converted to $SiO_2$ and $TiO_2$, respectively.

The alcoholic solution of alkoxysilane oligomer is preferably synthesized by adding an acid catalyst and water to an alcoholic solution containing alkoxysilane raw material and the organic chelate titanium compound, and hydrolyzing and condensation-polymerizing the alkoxysilane raw material and the organic chelate titanium compound.

Alternatively, the alcoholic solution of alkoxysilane oligomer may be prepared by adding an acid catalyst and water to an alcoholic solution containing an alkoxysilane raw material to hydrolyze and condensation-polymerize the alkoxysilane raw material to synthesize alkoxysilane oligomer, and mixing an organic chelate titanium compound with an alcoholic solution of the synthesized alkoxysilane oligomer.

In the present invention, the organic chelate titanium compound is preferably titanium alkoxide in which 40 to 60% of alkoxy groups are blocked or replaced by a chelate agent.

In the present invention, the alkoxysilane raw material used for the synthesis of alkoxysilane oligomer consists of 90 to 99 mol % of tetraalkoxysilane monomer or low molecular weight tetraalkoxysilane source oligomer (which have weight-averaged molecular weight (Mw) less than 800, and in a case of using low molecular weight oligomer, the mol % is determined by the total molar amount of the polymerized monomers), and the balance being alkylalkoxysilane monomer.

In the present invention, the alkylalkoxysilane monomer is preferably at least one selected from the group consisting of methyltrimethoxysilane, methyltriethoxysilane, ethyltrimethoxysilane, vinyltrimethoxysilane and γ-methacryloxypropyltrimethoxysilane.

In the present invention, the chelate agent is preferably β-diketone or octylene glycol. As β-diketone, acetylacetone is preferably used.

The alcoholic solution of alkoxysilane oligomer of the present invention preferably contains 0.1 to 2 weight % of alcohol-soluble resin. The alcohol-soluble resin is preferably polyvinyl butyral.

The alcoholic solution of alkoxysilane oligomer of the present invention preferably contains 0.004 to 0.10 weight % of boric acid.

In the present invention, 20 to 40 weight % of alcohol component in the alcoholic solution of alkoxysilane oligomer is preferably alcohol or glycol ether having a boiling point of 97° C. or more.

Further, the alcohol or the glycol ether having a boiling point of 97° C. or more is preferably at least one selected from the group consisting of n-propyl alcohol (boiling point: 97° C.), n-butyl alcohol (boiling point: 117° C.), propylene glycol monomethyl ether (hereinafter, abbreviated as "PGME", boiling point: 121° C.), ethylene glycol monoethyl ether (sometimes referred to as "ethyl cellosolve", boiling point: 136° C.) and ethylene glycol tert-butyl ether (hereinafter, abbreviated as "ETB", boiling point: 152.5° C.).

The metal part with zinc surfaces of the present invention is coated with a siliceous film of 0.5 to 3 µm in average thickness formed by the chromium-free rust-inhibitive surface treatment agent.

The zinc surface of a metal part is preferably coated with the chromium-free rust-inhibitive surface treatment agent by a dip and spin coating method to form a siliceous film thereon. In addition, the siliceous film is preferably baked at a temperature of 120° C. or less after coating.

In the present invention, a "film containing silica as a main component", that is, a "siliceous film" means a film containing 65 weight % or more of $SiO_2$ component.

Advantage of the Invention

In the chromium-free rust-inhibitive surface treatment agent of the present invention, silicon atoms in the alkoxysilane oligomer prepared as an alcoholic solution are partly replaced with titanium atoms, and thereby the rust-inhibitive performance of the zinc surface coated with a siliceous film can be improved, the time until the generation of white rust is extended to 210 hours or more and the time until the generation of red rust is extended to 1150 hours or more in a salt spray test, and simultaneously the adhesion of the siliceous film to the zinc surface can be improved.

When the alcoholic solution of the chromium-free rust-inhibitive surface treatment agent according to the present invention is applied onto the zinc surface of a metal part to form a thin siliceous film of 0.5 to 3 µm, white rusting resistance superior to that provided by conventional chromate treatment or the chromium-free rust-inhibitive surface treatment agent composed mainly of an alcoholic solution of alkoxysilane oligomer which the present inventors have previously proposed can be imparted to the zinc surface of a metal part. Further, a crazing phenomenon that occurs in the siliceous film with a lapse of time can be suppressed, and a phenomenon that the crazed siliceous film is peeled off from the zinc surface can be prevented.

Even when the siliceous film formed on the zinc surface of a metal part by the chromium-free rust-inhibitive surface treatment agent of the present invention is damaged with a knife or the like, the film component is diffused to the damaged portion in moist air to cover the damaged portion with a thin film, thereby exhibiting self-repairing properties for preventing the generation of white rust.

BEST MODE FOR CARRYING OUT THE INVENTION

The alkoxysilane oligomer which is a main effective component of the chromium-free rust-inhibitive surface treatment agent according to the present invention is an alkoxysilane oligomer in which silicon atoms in the molecule of the oligomer are partly replaced with titanium atoms, and has a molecular structure where oxygen and silicon or titanium are alternately bonded and forms a linear molecule with the length exhibiting good film forming property.

When the weight-averaged molecular weight (Mw) of the alkoxysilane oligomer molecule is too small, the film forming property and the rust-inhibitive performance capable of imparting to metal parts become poor, when the Mw is too large, the stability of the alcoholic solution (which means storage stability and becomes unusable due to occurrence of gelation with a lapse of time) is impaired and therefore the molecule of alkoxysilane oligomer needs to have weight-averaged molecular weight (Mw) of 1,000 to 10,000.

The alkoxysilane oligomer obtained by adding an acid catalyst and water to an alcoholic solution of alkoxysilane raw material to hydrolyze and condensation-polymerize the resulting mixture is composed of linear molecules, and the linear molecules are supposed to be either a single linear molecule or a ladder-type linear molecule. On the other hand, the alkoxysilane oligomer obtained by condensation-polymerizing using a basic catalyst in the alcoholic solution of alkoxysilane raw material tends to proceed with three-dimensional condensation-polymerization of the oligomer and is easily gelled, and therefore the alkoxysilane oligomer solution exhibits poor storage stability.

The alkoxysilane oligomer in which silicon atoms in the molecule are partly replaced with titanium atoms has more preferably weight-averaged molecular weight (Mw) of 1,500 to 5,000. In the present invention, the weight-averaged molecular weight (Mw) of the alkoxysilane oligomer can be measured using polystyrene standards and a tetrahydrofuran solvent by a gel permeation chromatography.

A siliceous film is formed on the zinc surface of a metal part using the chromium-free rust-inhibitive surface treatment agent consisting of an alcoholic solution of alkoxysilane oligomer in which silicon atoms in the molecule are partly replaced with titanium atoms, thereby exhibiting good rust-inhibitive performance, and even the siliceous film thinner than 1 µm can impart rust-inhibitive performance for practical use to a metal part with zinc surfaces. It is effective to make a siliceous film thinner for preventing crazing in the film and peeling off of the film formed.

Further, the siliceous film formed by applying an alcoholic solution of the alkoxysilane oligomer in which silicon atoms in the oligomer are partly replaced with titanium atoms on the zinc surface of a metal part has excellent adhesion to the zinc surface of a metal part, and even when crazing occurs in the siliceous film, the siliceous film does not peel off from the zinc surface.

When the replacement ratio of silicon atoms with titanium atoms is small in the molecule of alkoxysilane oligomer, the rust-inhibitive performance imparted to metal parts with zinc surfaces by the siliceous film formed by the chromium-free rust-inhibitive surface treatment agent is poor, and when the replacement ratio is too large, the cost becomes too high from the viewpoint of attained rust-inhibitive performance, and therefore the replacement ratio is preferably 2.5 to 15 atomic %. The replacement ratio of silicon atoms in the molecule of alkoxysilane oligomer with titanium atoms is more preferably 3 to 10 atomic %.

The alkoxysilane oligomer in which silicon atoms are partly replaced with titanium atoms can be synthesized by adding a small amount of an acid catalyst such as hydrochloric acid and water to an alcoholic solution containing an alkoxysilane raw material and a titanium alkoxide, and hydrolyzing and condensation-polymerizing the alkoxide mixture. However, the rapid hydrolysis of titanium alkoxide having high activity generates precipitation, and therefore it is preferred that 40 to 60% of alkoxy groups of titanium alkoxide are blocked or replaced by a chelate agent to decrease the reaction activity of titanium alkoxide before titanium alkoxide is mixed and condensation-polymerized with an alkoxysilane raw material in an alcohol solvent.

As the titanium alkoxide, titanium tetraalkoxide is preferably used. As the titanium tetraalkoxide, titanium tetraisopropoxide and titanium tetra-n-butoxide can be used. As the chelate agent for blocking or replacing alkoxy groups, β-diketone such as acetylacetone or octylene glycol can be used. Acetylacetone reacts with the zinc surface to consume the zinc layer, and therefore octylene glycol having low reaction activity with the zinc surface is preferably used as a chelate agent for titanium alkoxide in the chromium-free rust-inhibitive surface treatment agent of the present invention.

For the chromium-free rust-inhibitive surface treatment agent of the present invention, alkoxysilane monomer or low molecular weight oligomer (which have weight-averaged molecular weight (Mw) less than 800, and the mol % in a case of utilizing the oligomer is determined by the total molar amount of the polymerized monomers) is used as an alkoxysilane raw material, and an acid catalyst such as hydrochloric acid is added to the alcoholic solution of monomer or oligomer to hydrolyze and condensation-polymerize the alkoxysilane raw material, and thereby an alkoxysilane oligomer of a linear molecule having a desired weight-averaged molecular weight is prepared. As the acid catalyst, in addition to mineral acids such as hydrochloric acid, sulfuric acid and nitric acid, organic acids such as acetic acid can be used.

Alternatively, a chromium-free rust-inhibitive surface treatment agent can also be prepared by previously making an alcoholic solution of alkoxysilane oligomer which is condensation-polymerized using an acid catalyst so as to have a desired weight-averaged molecular weight, and then mixing an alcoholic solution of an organic chelate titanium compound in this solution to react the organic chelate titanium compound with the alkoxysilane oligomer.

When the alcoholic solution of the organic chelate titanium compound and the alcoholic solution of alkoxysilane oligomer having a desired weight-averaged molecular weight (Mw) are mixed afterwards, an alkoxysilane oligomer to which the molecule of the organic chelate titanium compound is additionally polymerized can be obtained.

The solution obtained by mixing an alcoholic solution of titanium alkoxide chelated with octylene glycol with an alcoholic solution of alkoxysilane monomer or alkoxysilane oligomer has less yellow coloring as compared with the solution obtained by mixing an alcoholic solution of titanium alkoxide chelated with acetylacetone with an alcoholic solution of alkoxysilane oligomer.

In the chromium-free rust-inhibitive surface treatment agent of the present invention, in order to form a siliceous film with a thickness providing rust-inhibitive performance for practical use on the zinc surface of a metal part, the total amount of silicon and titanium as converted to $SiO_2$ and $TiO_2$, respectively, is 5 to 20 weight % in an alcoholic solution of alkoxysilane oligomer containing a titanium component. The total amount of silicon and titanium is more preferably 7 to 15 weight %.

The alkoxysilane oligomer of a higher weight-averaged molecular weight (Mw) can form a siliceous film having excellent rust-inhibitive performance, and crazing hardly occurs in the film, and therefore the Mw is preferably as high as possible in such an extent that storage stability of the rust-inhibitive surface treatment agent solution is not impaired. Specifically, an alkoxysilane oligomer is condensation-polymerized so as to have weight-averaged molecular weight (Mw) of 1,000 to 10,000, and preferably 1,500 to 5,000.

Such an alkoxysilane oligomer can be synthesized by adjusting the pH of the alcoholic solution of mixed starting materials to about 4. Synthesis of alkoxysilane oligomer is preferably performed while maintaining the temperature of the alcoholic solution at 35° C. to 45° C. so that the progress of condensation-polymerization reaction becomes a saturated state in a short period of time. If the condensation-polymerization reaction is saturated, the progress of the reaction is slow while the alcoholic solution of alkoxysilane oligomer is kept at room temperature, and the alcoholic solution of alkoxysilane oligomer has good storage stability.

An organic component can be introduced into an alkoxysilane oligomer by copolymerizing a silane coupling agent that is an alkylalkoxysilane monomer having an organic group such as an alkyl group with tetraalkoxysilane monomer or low molecular weight alkoxysilane oligomer. In addition, an organic component can be introduced into a siliceous film by dissolving an alcohol-soluble organic resin in an alcoholic solution of alkoxysilane oligomer.

As the alkoxysilane raw material, tetraethoxysilane, tetramethoxysilane, and low molecular weight alkoxysilane oligomer obtained by condensation-polymerizing these monomers which are low in cost are preferably used. As the low molecular weight alkoxysilane oligomer, commercially available ethyl silicate 40 (pentamer molecule, Mw≈745) or methyl silicate 51 (tetramer molecule, Mw≈470) can be used.

Further, the chelate agent used for suppressing the reaction activity of titanium alkoxide remains in the alcoholic solution of alkoxysilane oligomer after synthesized, and even after a coated film of a rust-inhibitive surface treatment agent is baked on the zinc surface at a temperature of about 100° C., the chelate agent remains in the siliceous film and is supposed to be partly responsible for softening of the formed siliceous film.

When a chelate agent of more than 2 mols is blended with 1 mol of titanium alkoxide, the excess of the chelate agent over 2 mols is not consumed for formation of an organic chelate titanium compound due to the steric hindrance. As the chelate agent used for titanium alkoxide, β-diketone such as acetylacetone or octylene glycol is preferably used.

When acetylacetone is excessively blended, it is contained in an alcoholic solution as a high-boiling point solvent because acethylacetone has a boiling point as high as 140° C. Since octylene glycol is a high-boiling point solvent having a boiling point over 240° C., it functions as a high-boiling point solvent in the alcoholic solution similarly to acetylacetone.

When an alkylalkoxysilane monomer having organic groups directly bonded to the silicon atoms is partly introduced into an alkoxysilane oligomer, an alkoxysilane oligomer having organic groups bonded to the silicon atoms is formed. The siliceous film formed on the metal part surface can be softened and the effect of suppressing craze in the film can be obtained. The alkylalkoxysilane monomer is preferably at least one selected from the group consisting of methyltrimethoxysilane, methyltriethoxysilane, ethyltrimethoxysilane, vinyltrimethoxysilane and γ-methacryloxypropyltrimethoxysilane which have a low tendency to deteriorate rust-inhibitive performance. Particularly, vinyltrimethoxysilane is a preferred alkylalkoxysilane monomer.

However, when organic groups are excessively introduced, the rust-inhibitive performance obtained when a siliceous film is coated on the zinc surface tends to be reduced, and therefore an alkylalkoxysilane monomer is blended in a ratio of preferably 1 to 10 mol %, more preferably 2 to 8 mol % based on the total of alkoxysilane monomer in the raw materials to synthesize an alkoxysilane oligomer.

Further, a resin component can be introduced into a formed siliceous film by dissolving an alcohol-soluble resin in an alcoholic solution of a chromium-free rust-inhibitive surface treatment agent, and applying the rust-inhibitive surface treatment agent onto the zinc surface of a metal part. When the resin component is introduced into the siliceous film, the film becomes softened, and thereby the occurrence of crazing in the film can be suppressed. When the alcohol-soluble organic resin is water-soluble, the water-resistance of the siliceous film formed is impaired, and therefore a resin which is soluble in alcohol but insoluble in water is preferably selected.

As the resin suitable for this purpose, a polyvinyl butyral resin is preferred. The amount of polyvinyl butyral resin dissolved in an alcoholic solution of a chromium-free rust-inhibitive surface treatment agent is preferably 0.1 to 2 weight % and more preferably 0.2 to 1 weight %.

When a small amount of boric acid, in addition to organic resins such as a polyvinyl butyral resin, is dissolved in the alcoholic solution of the chromium-free rust-inhibitive surface treatment agent, the effect of suppressing the occurrence of craze is obtained. 0.004 to 0.10 weight % of boric acid is preferably dissolved in the alcoholic solution.

A dip and spin coating method is a coating method in which metal parts with zinc surfaces are immersed in an alcoholic solution of a chromium-free rust-inhibitive surface treatment agent; the wet metal parts are put out from the alcoholic solution to place them in a metal basket mounted on a centrifugal separator; and the basket is rotated to swing away an excess amount of the alcoholic solution of the chromium-free rust-inhibitive surface treatment agent adhered to the metal part surfaces by the centrifugal force. The metal parts coated with a thin liquid film (coated film) taken out from the basket are dried and baked at a temperature of about 100° C. to form a siliceous film.

The thickness of a coated film of a rust-inhibitive surface treatment agent formed on a zinc surface of metal parts by a dip and spin coating method is affected by the concentration of alkoxysilane oligomer in the alcoholic solution and the viscosity of the alcoholic solution in addition to the magnitude of centrifugal force applied to the metal parts. When a siliceous film is too thick, crazing tends to occur in the formed siliceous film, thereby increasing the consumption of the rust-inhibitive surface treatment agent solution to add the cost of surface treatment, and the siliceous film is preferably thinly formed in order to satisfy the required rust-inhibitive performance.

Although the film thickness of a siliceous film formed on metal part surfaces can be changed depending on the application, when the film thickness is thinner than 0.5 µm, the film is difficult to impart rust-inhibitive performance for practical use. The siliceous film formed on the zinc surface preferably has an average thickness of 0.5 to 3 µm so that the rust-inhibitive performance for practical use can be satisfied. Crazing or peeling off hardly occurs in the siliceous film having a thin average thickness, but the rust-inhibitive performance is poor. On the contrary, when the siliceous film is too thick, crazing or peeling off easily occurs, and therefore the average thickness is more preferably 0.7 to 2 µm.

The film thickness of the coated film of the rust-inhibitive surface treatment agent formed on the metal part surface can be adjusted by changing: the concentration of the alcoholic solution of the chromium-free rust-inhibitive surface treatment agent; the revolution speed of the spin coating method to control the centrifugal force; or the added amount of a resin component having a thickening effect to control the viscosity of the alcoholic solution of a chromium-free rust-inhibitive surface treatment agent.

The dip and spin coating method is suitable for applying a rust-inhibitive surface treatment agent solution to metal parts with small sizes such as bolts and nuts. In addition to the dip and spin coating method, a dip drain coating method, a spray coating method, brush coating and the like can be employed depending on the size and shape of the product to apply an alcoholic solution of a chromium-free rust-inhibitive surface treatment agent.

The concentration of an alcoholic solution of a chromium-free rust-inhibitive surface treatment agent is preferably changed depending on the method for coating metal parts, and when coated by the dip drain coating method or the spray coating method, the metal parts are preferably coated with an alcoholic solution having a low concentration.

When only low-boiling point alcohol is used for a solvent of the chromium-free rust-inhibitive surface treatment agent, the solvent rapidly evaporates when the room temperature is high, and the concentration of the solution increases by the evaporation of alcohol, and therefore alcohol is replenished as required to maintain a concentration suitable for coating.

Further, when a chromium-free rust-inhibitive surface treatment agent is applied onto the surface of metal parts in a high humid room air of rainy days, dew condensation occurs on the surface, and thereby the coated film of the chromium-free rust-inhibitive surface treatment agent applied may be degraded to reduce the rust-inhibitive performance of the siliceous film.

In order to reduce the evaporation of alcohol and to suppress dew condensation during summer season, 20 to 40 weight % of an alcohol component in the alcoholic solution is preferably replaced with alcohol or glycol ether having a boiling point of 97° C. or more.

As the alcohol or the glycol ether having a boiling point of 97° C. or more blended into the chromium-free rust-inhibitive surface treatment agent solution, n-propyl alcohol, n-butyl alcohol, PGME, ethylene glycol monoethyl ether and ETB can be used. When the humidity in the working atmosphere where the rust-inhibitive surface treatment agent solution is applied is high, dew condensation occurs on the surface of a formed film, thereby impairing the rust-inhibitive performance of the formed siliceous film, but the ETB is a particularly preferred solvent having an effect of preventing such an impairment of rust-inhibitive performance.

Coating of the chromium-free rust-inhibitive surface treatment agent film can be easily made on the zinc surfaces of a great number of metal parts having a small size at a time, and therefore it is preferred to apply the agent by the above dip and spin coating method.

It is preferred that the coated film of the rust-inhibitive surface treatment agent solution applied is dried and then baked while kept at a temperature of 120° C. or less to form a siliceous film. Since users prefer low baking temperatures, the coated film can also be dried at room temperature and then cured, but the rust-inhibitive performance which is imparted at 80° C. or less is a little poor. A siliceous film is preferably formed by baking the coated film at 90 to 110° C. so that the siliceous film with good rust-inhibitive performance can be efficiently formed on the surface of the metal parts in a short period of time. The heating time for baking the rust-inhibitive coated film at 90 to 110° C. is preferably 10 to 25 minutes.

The zinc surface in the present invention may be an alloy containing zinc as a main component, and the chromium-free rust-inhibitive surface treatment agent of the present invention may be preferably applied onto various galvanized metal parts or die cast zinc parts.

EXAMPLES

Hereinafter, the present invention will be specifically described by means of examples, but should not be limited to these examples.

Synthesis of Alkoxysilane Oligomer

Into 25.5 parts by weight of titanium tetraisopropoxide (TA-10 produced by Matsumoto Fine Chemical Co., Ltd.) as a titanium alkoxide, were mixed 60 parts by weight of isopropyl alcohol and 18 parts by weight of acetylacetone to obtain a solution (exhibiting a yellow color) in which about a half of hydrolyzable isopropoxy groups contained in titanium tetraisopropoxide are blocked with a chelate agent.

Next, into a raw material mixture solution obtained by mixing 250 parts by weight of ethyl silicate 40 (a product of Tama Chemicals Co., Ltd., an oligomer of approximately pentamer obtained by condensation-polymerizing tetraethoxysilane, and containing about 40 weight % of silicon as converted to $SiO_2$), 25 parts by weight of vinyltrimethoxysilane (SH6300 produced by Dow Corning Toray Co., Ltd.) and about 65 parts by weight of isopropyl alcohol, the above obtained solution in which about a half of isopropoxy groups of titanium tetraisopropoxide are blocked with the chelate agent was mixed. Acid water obtained by mixing 5.5 parts by weight of hydrochloric acid solution (1 Normal) and 27.9 parts by weight of water was added to this solution, and the resulting mixture was kept warm and condensation-polymerized at 35° C. for 24 hours while stirring to obtain an alkoxysilane oligomer solution A shown in Column A of Table 1. 9.2 mol % of the alkoxysilane raw materials used for the alkoxysilane oligomer solution A (in this case, ethyl silicate 40 was deemed as equivalent monomers. Hereinafter, the same treatment shall be applied.) was an alkylalkoxysilane monomer.

In the alkoxysilane oligomer solution A obtained here, 4.7 atomic % of silicon was replaced with titanium and the total content of silicon and titanium was 24.6 weight % when silicon and titanium were converted to $SiO_2$ and $TiO_2$, respectively. The weight-averaged molecular weight of the alkoxysilane oligomer was measured by a gel permeation chromatography (HLC-8120GPC manufactured by Tosoh Corporation) (using tetrahydrofuran as a solvent and polystyrene as standards) to give a value of 2010.

Similarly, the composition shown in Column B in Table 1 formulated by decreasing the blending amount of vinyltrimethoxysilane was kept warm and condensation-polymerized at 35° C. for 24 hours while stirring to obtain an alkoxysilane oligomer solution B (the replacement ratio of silicon with titanium was 5 atomic % and the total content of silicon and titanium was 21.8 weight % when silicon and titanium were converted to $SiO_2$ and $TiO_2$, respectively.). 2 mol % of the alkoxysilane raw materials used for the alkoxysilane oligomer solution B was an alkylalkoxysilane monomer, and the quantity of the acetylacetone chelate agent was an amount of blocking about a half of isopropoxy groups contained in the used titanium tetraisopropoxide. The alkoxysilane oligomer had a weight averaged-molecular weight of 2270.

Next, the composition shown in Column C in Table 1 formulated by blending excess acetylacetone (in which acetylacetone corresponding to 1.5 times isopropoxy groups contained in the used titanium tetraisopropoxide was blended) was kept warm and condensation-polymerized at 35° C. for 24 hours while stirring to obtain a yellow-colored alkoxysilane oligomer solution C (the replacement ratio of silicon with titanium was 6.6 atomic %, and the total content of silicon and titanium was 21.4 weight % when silicon and titanium were converted to $SiO_2$ and $TiO_2$, respectively.). 2 mol % of the alkoxysilane raw materials used for the alkoxysilane oligomer solution C was an alkylalkoxysilane monomer. The alkoxysilane oligomer had a weight averaged-molecular weight of 1760.

Further, the composition shown in Column D of Table 1 which was formulated using 16.7 mol % of γ-methacryloxypropyltrimethoxysilane (SH6030) as an alkylalkoxysilane monomer based on the total of alkoxysilane raw materials and using n-butyl alcohol as a solvent in place of isopropyl alcohol was kept warm and condensation-polymerized at 35° C. for 24 hours while stirring to obtain an alkoxysilane oligomer solution D (the replacement ratio of silicon with titanium was 14.3 atomic %, and the total content of silicon and titanium was 23.4 weight % when silicon and titanium were converted to $SiO_2$ and $TiO_2$, respectively.). It is to be noted that the amount of acetylacetone used here was an amount corresponding to 25% of isopropoxy groups contained in titanium tetraisopropoxide. The alkoxysilane oligomer had a weight averaged-molecular weight of 1720.

Further, the composition shown in Column E of Table 1 which was formulated using titanium tetra-n-butoxide in place of titanium tetraisopropoxide was kept warm and condensation-polymerized at 35° C. for 24 hours while stirring to obtain an alkoxysilane oligomer solution E (the replacement ratio of silicon with titanium was 12.2 atomic %, and the total content of silicon and titanium was 18.7 weight % when silicon and titanium were converted to $SiO_2$ and $TiO_2$, respectively.). It is to be noted that an alkylalkoxysilane monomer was not added to the alkoxysilane oligomer solution E. In addition, the amount of acetylacetone used as a chelate agent was an amount corresponding to 33% of n-butoxy groups contained in titanium tetra-n-butoxide. The alkoxysilane oligomer had a weight averaged-molecular weight of 1910.

Further, the composition shown in Column F of Table 1 which was formulated using 8.0 mol % of methyltriethoxysilane (SZ6383 produced by Dow Corning Toray Co., Ltd.) as an alkylalkoxysilane monomer based on the total of alkoxysilane raw materials was kept warm and condensation-polymerized at 35° C. for 24 hours while stirring to obtain an alkoxysilane oligomer solution F (the replacement ratio of silicon with titanium was 4.9 atomic %, and the total content of silicon and titanium was 22.7 weight % when silicon and titanium were converted to $SiO_2$ and $TiO_2$, respectively.). It is to be noted that the amount of acetylacetone used here was an amount corresponding to 42% of isopropoxy groups contained in titanium isopropoxide. The alkoxysilane oligomer had a weight averaged-molecular weight of 1990.

Next, the composition shown in Column G in Table 1 which was formulated without blending an alkylalkoxysilane monomer or a titanium alkoxide was kept warm and condensation-polymerized at 35° C. for 24 hours while stirring to obtain an alkoxysilane oligomer solution G (the content of silicon was 20 weight % when silicon was converted to $SiO_2$.). The alkoxysilane oligomer had a weight averaged-molecular weight of 2310.

Further, as shown in Column H of Table 1, the composition formulated by blending 2 mol % of vinyltrimethoxysilane in an alcoholic solution of ethyl silicate 40 based on the total of alkoxysilane raw materials and blending no titanium alkoxide was kept warm and condensation-polymerized at 40° C. for 20 hours while stirring to obtain an alkoxysilane oligomer solution H (no titanium component was contained, and the content of silicon was 20.2 weight % when silicon was converted to SiO₂). The alkoxysilane oligomer had a weight averaged-molecular weight of 2004.

Next, as shown in Column I of Table 1, the composition formulated by increasing the blending amount of vinyltrimethoxysilane to 9.1 mol % of the total of alkoxysilane raw materials and blending no titanium alkoxide was kept warm and condensation-polymerized at 40° C. for 20 hours while stirring to obtain an alkoxysilane oligomer solution I (no titanium component was contained, and the content of silicon was 19.3 weight % when silicon was converted to SiO₂). The alkoxysilane oligomer had a weight averaged-molecular weight of 2020.

Further, as shown in Column J of Table 1, the composition formulated by blending vinyltrimethoxysilane, hydrochloric acid solution (1 Normal) and water to 250 parts by weight of ethyl silicate 40 was kept warm at 35° C. for 24 hours to synthesize an alkoxysilane oligomer. After the alcoholic solution of the alkoxysilane oligomer synthesized was stored in a hermetically sealed state for about 2.5 years, the weight averaged-molecular weight of the alkoxysilane oligomer in the alcoholic solution was measured to be 7820. Since the weight averaged-molecular weight of the alkoxysilane oligomer immediately just after synthesized was usually about 2,000, it was understood that condensation-polymerization had further progressed during storage.

Example 1

Into 48 parts by weight of the alkoxysilane oligomer solution A, 7.5 parts by weight of a 10 weight % ethyl cellosolve solution of polyvinylbutyral, 1 part by weight of a 0.6 weight % isopropyl alcohol solution of boric acid and 44.5 parts by weight of isopropyl alcohol were mixed to obtain the alcoholic solution of the chromium-free rust-inhibitive surface treatment agent of EXAMPLE 1 shown in Table 2-1. The total content of silicon and titanium in the chromium-free rust-inhibitive surface treatment agent solution was 11.7 weight % when silicon and titanium were converted to SiO₂ and TiO₂, respectively.

Next, five M8 bolts (half screws each with an underhead length of 45 mm) galvanized (plated thickness: 5 to 7 μm) in a zincate bath were placed and stirred in the chromium-free rust-inhibitive surface treatment agent solution of EXAMPLE 1 in a container, and then taken out from the container. The five bolts were placed in a stainless basket mounted on a centrifugal separator, and the basket was rotated at 700 RPM (radius of gyration: about 150 mm) for 4 seconds to shake off an excess amount of the chromium-free rust-inhibitive surface treatment agent solution adhered to the surfaces of the M8 bolts. Subsequently, the wet bolts with the rust-inhibitive surface treatment agent were put on a stainless

TABLE 1

| | Alkoxysilane Oligomer Solution (Composition in weight parts) | | | | | | | | | |
|---|---|---|---|---|---|---|---|---|---|---|
| | A | B | C | D | E | F | G | H | I | J |
| Alkoxysilane Raw Material | | | | | | | | | | |
| Tetraethoxysilane (Ethylsilicate 40) | 250 | 250 | 250 | 200 | 225 | 240 | 250 | 250 | 250 | 250 |
| Alkylalkoxysilane Monomer | | | | | | | | | | |
| Vinyltrimethoxysilane (SH6300) | 25 | 5 | 5 | | | | | 5 | 25 | 5 |
| γ-methacryloxypropyl trimethoxysilane (SH6030) | | | | 66.6 | | | | | | |
| Methyltriethoxysilane (SZ6383) | | | | | | 25 | | | | |
| Titanium alkoxide | | | | | | | | | | |
| Titanium tetraisopropoxide (TA-10) | 25.5 | 25.5 | 34.0 | 76.2 | | 25.5 | | | | |
| Titanium tetra n-butoxide (TA-25) | | | | | 70.8 | | | | | |
| Chelate agent   Acetylacetone | 18.0 | 18.0 | 72.0 | 26.8 | 27.3 | 15.0 | | | | |
| 1 Normal Hydrochloric acid | 5.5 | 6.1 | 6.1 | 3.3 | 3.3 | 5.5 | 3.3 | 4.0 | 4.0 | 5.0 |
| Water | 27.9 | 24.4 | 24.4 | 26.0 | 23.4 | 30.0 | 26.0 | 27.0 | 27.0 | 27.0 |
| Solvent | | | | | | | | | | |
| n-butyl alcohol | | | | 150 | | | | | | |
| Isopropyl alcohol | 125.0 | 171.1 | 130.8 | | 220.0 | 151.5 | 220.0 | 218.4 | 265.0 | 220.0 |
| Total weight parts | 476.9 | 500.1 | 522.3 | 548.9 | 569.8 | 492.5 | 499.3 | 504.4 | 571.0 | 506.0 |
| Replacement ratio (%) of silicon with titanium | 4.7 | 5.0 | 6.6 | 14.3 | 12.2 | 4.9 | 0.0 | 0.0 | 0.0 | 0.0 |
| Alkylalkoxysilane (mol %) | 9.2 | 2.0 | 2.0 | 16.7 | 0.0 | 8.0 | 0.0 | 2.0 | 9.1 | 2.0 |
| Content (weight %) converted to SiO₂ + TiO₂ | 24.6 | 21.8 | 21.4 | 23.4 | 18.7 | 22.7 | 20.0 | 20.2 | 19.3 | 19.8 |
| Weight averaged molecular weight (Mw) | 2010 | 2270 | 1760 | 1720 | 1910 | 1990 | 2310 | 2004 | 2020 | 7820 |

Ethylsilicate 40: Liquid of low molecular weight ethoxysilane-oligomer available from Tama Chemicals Co., Ltd. (Containing pentamer molecules of tetraethoxysilane, as its main constituent, and Si of about 40 weight % as converted to SiO₂).
Alkoxysilane (mol %): Mol % of monomer converted alkoxysilane oligomer, and one mol of ethylsilicate 40 (pentamer, molecular weight: 744.5) is counted to be 5 mole monomers.
SH6300: Silane coupling agent (vinyltrimethoxy silane, molecular weight: 148.2) available from Dow Corning Toray Co., Ltd.
SH6030: Silane coupling agent (γ-methacryloxypropyl trimethoxysilane, molecular weight: 248) available from Dow Corning Toray Co., Ltd.
SZ6383: Methyltriethoxysilane (Molecular weight: 178) available from Dow Corning Toray Co., Ltd.
TA-10: Titanium tetraisopropoxide (Molecular weight: 283.8) available from Matsumoto Fine Chemical Co., Ltd.
TA-25: Titanium tetra n-butoxide (Molecular weight: 339.9) available from Matsumoto Fine Chemical Co., Ltd.

wire mesh, placed in a baking furnace and dried at 60° C. for 10 minutes, and then the temperature was elevated to 100° C. and maintained at 100° C. for 15 minutes to bake the bolts. One of M8 bolts coated with the coated film of the chromium-free rust-inhibitive surface treatment agent of EXAMPLE 1 was observed with a stereoscopic microscope (magnification: about 40 times) to examine the presence or absence of crazing. The other four M8 bolts were placed in a salt spray tester (SST) in accordance with JIS-Z-2371, and after 24 hours, one of the bolts was taken out, rinsed with water and dried, and then the surface of the bolt was observed with the stereoscopic microscope (magnification: about 40 times) to examine the presence or absence of crazing occurred in the rust-inhibitive coated film. The other three bolts were placed in the salt spray tester as they were, and the surfaces of the bolts were observed with the naked eye every 24 hours and the time when white rust or red rust was generated was recorded.

The time when white rust or red rust was generated shown in each of Table 2-1, Table 2-2 and Table 3 is the time when white rust or red rust was observed in two of the three bolts.

The bolt coated with a siliceous film of the chromium-free rust-inhibitive surface treatment agent of EXAMPLE 1 hardly was crazed in the coated film to exhibit a good rust-inhibitive performance against the generation of white rust and red rust. Further, each of the bolts observed with the stereoscopic microscope was buried in a resin to make a cut sample. The cross-section of the bolt in the cut sample was observed with the microscope to examine the film thickness of the siliceous film, and the average film thickness observed was a little thinner than 2 μm. In addition, the film thickness was also examined for each of EXAMPLES 2 to 19 and Comparative EXAMPLES 1 to 3, and as a result, all of the siliceous films coated on other bolts had an average film thickness of 0.7 to 2 μm except for the siliceous film of COMPARATIVE EXAMPLE 1 which had an average film thickness of 2.3 μm.

It is a kind of acceleration test for causing crazing in a siliceous film that the M8 bolts coated with the siliceous film of the chromium-free rust-inhibitive surface treatment agent were put out from the salt spray tester after 24 hours, rinsed with water and then dried to examine the presence or absence of crazing occurred in the film with a stereoscopic microscope, and it is an alternative test to examine whether crazing occurred in the rust-inhibitive film or not after the M8 bolts coated with the siliceous film of the chromium-free rust-inhibitive surface treatment agent were left standing for a long period of time.

Example 2

Into 52.8 parts by weight of the alkoxysilane oligomer solution B, a 10 weight % ethyl cellosolve solution of polyvinylbutyral, a 0.6 weight % isopropyl alcohol solution of boric acid and isopropyl alcohol were mixed to obtain the chromium-free rust-inhibitive surface treatment agent solution of EXAMPLE 2 as shown in Table 2-1.

Example 3

Into 48.0 parts by weight of the alkoxysilane oligomer solution B, 3 parts by weight of a 10 weight % ethyl cellosolve solution of polyvinylbutyral, 5 parts by weight of a 0.6 weight % isopropyl alcohol solution of boric acid and 38 parts by weight of isopropyl alcohol were mixed to obtain the chromium-free rust-inhibitive surface treatment agent of EXAMPLE 3.

Next, the chromium-free rust-inhibitive surface treatment agent of each of EXAMPLE 2 and EXAMPLE 3 was applied onto five M8 bolts (half screws each with an underhead length of 45 mm) by a dip and spin coating method and then baked in the same manner as in EXAMPLE 1. The presence or absence of crazing for one of the M8 bolts was examined with a stereoscopic microscope, and the other four M8 bolts were placed in the salt spray tester, and after 24 hours, one of the bolts was taken out, rinsed with water and dried, and then the presence or absence of crazing was similarly examined with the stereoscopic microscope. The results were shown in Table 2-1. Further, the presence or absence of the generation of white rust or red rust for each of the three bolts placed in the salt spray tester was observed with the naked eye every 24 hours, and the time when the generation of white rust or red rust was observed in two of the three bolts was recorded in Table 2-1.

Both of the crazing resistance and the rust-inhibitive performance in each of EXAMPLE 2 and EXAMPLE 3 were good, and the crazing observed in the siliceous film coated on each of the M8 bolts which were placed in the salt spray tester for 24 hours, taken out and then dried, was slight, and it was a level causing no problem for practical use.

Examples 4 to 6

The chromium-free rust-inhibitive surface treatment agents of EXAMPLES 4 to 6 were experimentally produced using the alkoxysilane oligomer solution B composed of the formulation compositions shown in Table 2-1. The chromium-free rust-inhibitive surface treatment agents of EXAMPLES 4 to 6 were prepared by partly replacing easily evaporative isopropyl alcohol having a low boiling point with PGME, ethyl cellosolve and n-propyl alcohol which are alcohol solvents having a high boiling point, respectively, in EXAMPLE 4 to EXAMPLE 6. Each of these chromium-free rust-inhibitive surface treatment agents was applied onto M8 bolts by a dip and spin coating method, dried and then baked in the same manner as in EXAMPLE 1. The crazing resistance and the rust-inhibitive performance were examined for these bolts in the same manner as in EXAMPLE 1. All results were good as shown in Table 2-1. Further, the evaporation of alcohol from the alcoholic solution of the chromium-free rust-inhibitive surface treatment agent could be made slow by blending an alcohol solvent having a high boiling point, and even when the chromium-free rust-inhibitive surface treatment agent was applied onto metal parts during the summer season when air temperature is high, the amount of replenishing alcohol evaporated to the rust-inhibitive surface treatment agent could be decreased.

Example 7

The alkoxysilane oligomer solution C synthesized by excessively adding acetylacetone chelate agent was used to prepare the chromium-free rust-inhibitive surface treatment agent of EXAMPLE 7 composed of the formulation composition shown in Table 2-1. The chromium-free rust-inhibitive surface treatment agent solution was applied onto five M8 bolts galvanized in a zincate bath by a dip and spin coating method, dried and then baked in the same manner as in EXAMPLE 1. The crazing resistance and the rust-inhibitive performance were examined for these bolts in the same manner as in EXAMPLE 1, and all results were good as shown in Table 2-1, but the effect obtained by excessively adding acetylacetone could not be recognized.

Example 8

The alkoxysilane oligomer solution D synthesized by adding γ-methacryloxypropyltrimethoxysilane as alkylalkoxysilane monomer in place of vinyltrimethoxysilane was used to prepare the chromium-free rust-inhibitive surface treatment agent of EXAMPLE 8 composed of the formulation composition shown in Table 2-1. Next, this chromium-free rust-inhibitive surface treatment agent was applied onto five M8 bolts galvanized in a zincate bath by a dip and spin coating method, dried and then baked in the same manner as in EXAMPLE 1. The crazing resistance and the rust-inhibitive performance were examined for these bolts in the same manner as in EXAMPLE 1, and as a result, the rust-inhibitive coated film became softened and the rust-inhibitive siliceous film causing no crazing could be obtained, but the film resulted in a little poor rust-inhibitive performance, as shown in Table 2-1.

Example 9

The alkoxysilane oligomer solution E obtained by blending no alkylalkoxysilane monomer and using titanium tetra-n-butoxide as a titanium alkoxide was used to prepare the chromium-free rust-inhibitive surface treatment agent of EXAMPLE 9 composed of the formulation composition shown in Table 2-1. Next, the chromium-free rust-inhibitive surface treatment agent was applied onto five M8 bolts galvanized in a zincate bath by a dip and spin coating method, dried and then baked while maintained at 100° C. for 15 minutes in the same manner as in EXAMPLE 1. The crazing resistance and the rust-inhibitive performance were examined for these bolts in the same manner as in EXAMPLE 1, and all results were substantially good as shown in Table 2-1.

Example 10

The alkoxysilane oligomer solution F which was condensation-polymerized by adding methyltriethoxysilane and using titanium tetraisopropoxide chelated with acetylacetone was used, and PGME having a boiling point of 121° C. was partly blended into alcohol in the alcoholic solution, and thereby the chromium-free rust-inhibitive surface treatment agent of EXAMPLE 10 was prepared in the formulation composition shown in Table 2-1. Next, the chromium-free rust-inhibitive surface treatment agent was applied onto five M8 bolts galvanized in a zincate bath by a dip and spin coating method, dried and then baked while maintained at 100° C. for 15 minutes in the same manner as in EXAMPLE 1. The crazing resistance and the rust-inhibitive performance were examined for these bolts in the same manner as in EXAMPLE 1, and all results were substantially good as shown in Table 2-1.

Example 11

Into 52.8 parts by weight of the alkoxysilane oligomer solution H containing no titanium component which was condensation-polymerized by blending vinyltrimethoxysilane, 3 parts by weight of a 10 weight % ethyl cellosolve solution of polyvinylbutyral, 5 parts by weight of a 1.2 weight % isopropyl alcohol solution of boric acid, 23.8 parts by weight of isopropyl alcohol, 5.4 parts by weight of a titanium octylene glycol chelate compound produced by Nippon Soda Co., Ltd. (a compound whose alkoxy group is isopropoxide, hereinafter, referred to as "TOG"), 10 parts by weight of PGME and 15 parts by weight of ETB were mixed to prepare the chromium-free rust-inhibitive surface treatment agent of EXAMPLE 11 shown in Table 2-2. The total content of silicon and titanium contained in this chromium-free rust-inhibitive surface treatment agent solution was 9.9 weight % when silicon and titanium were converted to $SiO_2$ and $TiO_2$, respectively, and the content ratio of titanium to the total amount of silicon and titanium was 4.6 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and all results were good as shown in Table 2-2.

Example 12

The alkoxysilane oligomer solution I containing no titanium component which was condensation-polymerized by increasing the blending ratio of vinyltrimethoxysilane was used to prepare the chromium-free rust-inhibitive surface treatment agent of EXAMPLE 12 having the formulation composition shown in Table 2-2 in the same manner as in EXAMPLE 11. The total content of silicon and titanium in this chromium-free rust-inhibitive surface treatment agent solution was 9.5 weight % when silicon and titanium were converted to $SiO_2$ and $TiO_2$, respectively, and the content ratio of titanium to the total amount of silicon and titanium was 4.8 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the rust-inhibitive performance was slightly inferior to that of EXAMPLE 11, but all results were substantially good as shown in Table 2-2.

Example 13

Using 52.8 parts by weight of the alkoxysilane oligomer solution H and blending the amount of TOG decreased to 3.2 parts by weight as compared with EXAMPLE 11, the chromium-free rust-inhibitive surface treatment agent of EXAMPLE 13 having the formulation composition shown in Table 2-2 was prepared. The total content of silicon and titanium in the chromium-free rust-inhibitive surface treatment agent solution was 11.0 weight % when silicon and titanium were converted to $SiO_2$ and $TiO_2$, respectively, and the content ratio of titanium to the total amount of silicon and titanium was 2.7 atomic %.

Next, the chromium-free rust-inhibitive surface treatment agent was applied onto the surfaces of the five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1. As a result, by blending a smaller amount of the titanium octylene glycol chelate compound than that of the chromium-free rust-inhibitive surface treatment agent of EXAMPLE 11, the rust-inhibitive performance was slightly inferior to that of EXAMPLE 11, but all results were substantially good as shown in Table 2-2.

Example 14

Into 52.8 parts by weight of the alkoxysilane oligomer solution H, 7.6 parts by weight of a titanium octylene glycol chelate compound TC-200 (a compound produced by Matsumoto Fine Chemical Co., Ltd. whose alkoxy group is n-octoxide, hereinafter referred to as "TC-200") was blended to prepare the chromium-free rust-inhibitive surface treatment agent of EXAMPLE 14 having the formulation composition shown in Table 2-2. The total content of silicon and titanium in this chromium-free rust-inhibitive surface treatment agent solution was 11.3 weight % when silicon and titanium were converted to $SiO_2$ and $TiO_2$, respectively, and the content ratio of titanium to the total amount of silicon and titanium was 4.6 atomic %.

Next, the chromium-free rust-inhibitive surface treatment agent was applied onto the five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the rust-inhibitive performance was slightly inferior to that of EXAMPLE 11, supposedly because alkoxide groups of the titanium octylene glycol chelate compound were different from those of EXAMPLE 11, but substantially good results were obtained as shown in Table 2-2.

Example 15

Into 52.8 parts by weight of the alkoxysilane oligomer solution H, a titanium chelate compound TC-100 (a product of Matsumoto Fine Chemical Co., Ltd.) in which about a half of isopropoxy groups contained in titanium tetraisopropoxide were chelated by adding 2 mols of acetylacetone to 1 mol of titanium tetraisopropoxide was blended to obtain the chromium-free rust-inhibitive surface treatment agent of EXAMPLE 15 shown in Table 2-2. The total content of silicon and titanium in the chromium-free rust-inhibitive surface treatment agent solution was 11.6 weight % when silicon and titanium were converted to $SiO_2$ and $TiO_2$, respectively, and the content ratio of titanium to the total amount of silicon and titanium was 6.1 atomic %.

Next, the chromium-free rust-inhibitive surface treatment agent was applied onto the surfaces of five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the rust-inhibitive performance was slightly inferior to that of EXAMPLE 11, but all results were substantially good as shown in Table 2-2.

Example 16

Together with TOG, both PGME and ethyl cellosolve that are high-boiling point alcohols were blended into 45.9 parts by weight of the alkoxysilane oligomer solution H to prepare the chromium-free rust-inhibitive surface treatment agent of EXAMPLE 16 shown in Table 2-2. The total content of silicon and titanium in the chromium-free rust-inhibitive surface treatment agent solution was 9.9 weight % when silicon and titanium were converted to $SiO_2$ and $TiO_2$, respectively, and the content ratio of titanium to the total amount of silicon and titanium was 4.6 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the rust-inhibitive performance was slightly inferior to that of EXAMPLE 11, but all results were substantially good as shown in Table 2-2.

Example 17

Together with TOG, PGME and ethyl cellosolve that are high-boiling point alcohols were blended into 52.8 parts by weight of the alkoxysilane oligomer solution J to prepare the chromium-free rust-inhibitive surface treatment agent of EXAMPLE 17 shown in Table 2-2. The total content of silicon and titanium in the chromium-free rust-inhibitive surface treatment agent solution was 11.1 weight % when silicon and titanium were converted to $SiO_2$ and $TiO_2$, respectively, and the content ratio of titanium to the total amount of silicon and titanium was 4.7 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, good results were obtained as shown in Table 2-2.

Example 18

TOG was blended into 73.4 parts by weight of the alkoxysilane oligomer solution H to prepare the chromium-free rust-inhibitive surface treatment agent of EXAMPLE 18 shown in Table 2-2. The total content of silicon and titanium in the chromium-free rust-inhibitive surface treatment agent solution was 18.9 weight % when silicon and titanium were converted to $SiO_2$ and $TiO_2$, respectively, and the content ratio of titanium to the total amount of silicon and titanium was 4.6 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the rust-inhibitive performance was slightly inferior to that of EXAMPLE 11, but all results were substantially good as shown in Table 2-2.

Example 19

Together with TOG, PGME and ETB that are high-boiling point alcohols were blended into 45.9 parts by weight of the alkoxysilane oligomer solution H to prepare the chromium-free rust-inhibitive surface treatment agent of EXAMPLE 19 shown in Table 2-2. The total content of silicon and titanium in the chromium-free rust-inhibitive surface treatment agent solution was 6.6 weight % when silicon and titanium were converted to $SiO_2$ and $TiO_2$, respectively, and the content ratio of titanium to the total amount of silicon and titanium was 4.6 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the rust-inhibitive performance was slightly inferior to that of EXAMPLE 11, but both results were substantially good as shown in Table 2-2.

Besides, the titanium chelate compound used in EXAMPLES 11 to 19 is a commercially available product in which a half of alkoxy groups in a titanium tetraalkoxide are blocked with a chelate agent.

TABLE 2-1

| Components in Chromium-free Rust-inhibitive Surface Treatment Agent | EXAMPLE (Composition in weight parts) | | | | | | | | | |
|---|---|---|---|---|---|---|---|---|---|---|
| | 1 | 2 | 3 | 4 | 5 | 6 | 7 | 8 | 9 | 10 |
| | A | B | B | B | B | B | C | D | E | F |
| Alkoxysilane oligomer solution | 48.0 | 52.8 | 48.0 | 52.8 | 52.8 | 52.8 | 52.8 | 48.0 | 48.0 | 65.0 |
| Polyvinyl butyral resin solution | 7.5 | 3.0 | 3.0 | 3.0 | 3.0 | 3.0 | 6.0 | | | 5.0 |
| 0.6 wt % boric acid solution | 1 | 1 | 5 | 10 | 10 | 10 | 1 | | | |
| Alcohol solvent | | | | | | | | | | |
|    Isopropyl alcohol | 44.5 | 44.1 | 38.0 | 4.2 | 4.2 | 4.2 | 41.0 | 48.0 | 48.0 | 30.0 |
|    High-boiling point alcohol | | | | | | | | | | |
|       PGME | | | | 35.0 | | | | | | 20.0 |
|       Ethyl Cellosolve | | | | | 35.0 | | | | | |
|       n-propyl alcohol | | | | | | 35.0 | | | | |
| Total weight parts | 101.0 | 100.9 | 94.0 | 105.0 | 105.0 | 105.0 | 100.8 | 96.0 | 96.0 | 120.0 |
| Ti/(Ti + Si) (atomic %) | 4.7 | 5.0 | 5.0 | 5.0 | 5.0 | 5.0 | 6.6 | 14.3 | 12.2 | 4.9 |
| Content (wt %) converted to $SiO_2 + TiO_2$ | 11.7 | 11.4 | 11.1 | 11.0 | 11.0 | 11.0 | 11.2 | 11.7 | 9.4 | 11.4 |
| Appearance of crazes | | | | | | | | | | |
|    After coated and baked | No | No | No | No | No | No | No | No | No | No |
|    After 24 hours of salt spray test | No | No | A little bit | A little bit | A little bit | A little bit | A little bit | No | A little bit | A little bit |
| Result of Salt spray test | | | | | | | | | | |
|    White rust (hours) | 264 | 336 | 312 | 360 | 360 | 336 | 432 | 216 | 264 | 216 |
|    Red rust (hours) | 1464 | 1656 | 1488 | 1680 | 1608 | 1584 | 1368 | 1224 | 1248 | 1200 |

Polyvinyl butyral resin solution: 10 weight % solution of polyvinyl butyral resin (BM-1: Available from Sekisui Chemical Co., Ltd.) solved in Ethyl Cellosolve.
0.6 wt % boric acid solution: Isopropyl alcohol solution of boric acid (0.6 wt %)
PGME: Propylen glycol monomethyl ether
Ethy Cellosolve: Ethylene glycol monoethyl ether

TABLE 2-2

| Components in Chromium-free Rust-inhibitive Surface Treatment | EXAMPLE (Composition in weight parts) | | | | | | | | |
|---|---|---|---|---|---|---|---|---|---|
| | 11 | 12 | 13 | 14 | 15 | 16 | 17 | 18 | 19 |
| | H | I | H | H | H | H | J | H | H |
| Alkoxysilane oligomer solution | 52.8 | 52.8 | 52.8 | 52.8 | 52.8 | 45.9 | 52.8 | 73.4 | 45.9 |
| Polyvinyl butyral resin solution | 3 | 3 | 3 | 3 | 3 | 2.6 | 3 | 2.6 | 2.6 |
| 1.2 wt % boric acid solution | 5 | 5 | 5 | 5 | 5 | 4.4 | 5 | 0 | 2 |
| Alcohol solvent | | | | | | | | | |
|    Isopropyl alcohol | 23.8 | 23.8 | 11 | 16.6 | 20 | 20.7 | 23.8 | 0 | 44 |
|    High-boiling point alcohol | | | | | | | | | |
|       PGME | 10 | 10 | 15 | 15 | 15 | 8.7 | 10 | 0 | 16.7 |
|       Ethyl Cellosolve | | | | | | 13 | | | |
|       ETB | 15 | 15 | 10 | | | | 15 | 0 | 25 |
|       n-propyl alcohol | | | | | | | | | |
| Titanium Chelate compound | | | | | | | | | |
|    TOG | 5.4 | 5.4 | 3.2 | | | 4.7 | 5.4 | 7.5 | 4.7 |
|    TC-200 | | | | 7.6 | | | | | |
|    TC-100 | | | | | 4.2 | | | | |
| Total weight parts | 115 | 115 | 100 | 100 | 100 | 100 | 115 | 83.5 | 140.9 |
| Ti/(Ti + Si) (atomic %) | 4.6 | 4.8 | 2.7 | 4.6 | 6.1 | 4.6 | 4.7 | 4.6 | 4.6 |
| Content (wt %) converted to $SiO_2 + TiO_2$ | 9.9 | 9.5 | 11.0 | 11.3 | 11.5 | 9.9 | 11.1 | 18.9 | 6.6 |
| Appearance of crazes | | | | | | | | | |
|    After coated and baked | No | No | No | No | No | No | No | No | No |
|    After 24 hours of salt spray | No | No | No | No | No | No | No | A little bit | No |
| Result of Salt spray test | | | | | | | | | |
|    White rust (hours) | 360 | 288 | 264 | 336 | 336 | 312 | 360 | 336 | 312 |
|    Red rust (hours) | 1416 | 1152 | 1200 | 1320 | 1296 | 1224 | 1440 | 1320 | 1200 |

ETB: Ethylen glycol monotertiary-butyl ether
1.2 wt % boric acid solution: Isopropyl alcohol solution of boric acid (1.2 wt %)
TOG: Titanium octyleneglycol chelate compound available from Nippon Soda Co., Ltd. (Purity: 72%, Alkoxy group: Isopropoxy group)
TC-200: Titanium octylenglycol chelate compound available from Matsumoto Fine Chemical Co., Ltd. (Purity: 67%, Alkoxy group: n-octoxy group)
TC-100: Chelated titanium compound formed by reacting 1 mol of titanium tetraisopropoxide with 2 mols of acetylacetone. (Available from Matsumoto Fine Chemical Co., Ltd.)

Comparative Example 1

The alkoxysilane oligomer solution G in which silicon atoms are not replaced with titanium atoms was used, and into this alkoxysilane oligomer solution G, an ethyl cellosolve solution of a polyvinyl butyral resin, γ-glycidoxypropyltrimethoxysilane that is a silane coupling agent having an epoxy functional group, and nano-sized powder slurry of titanium oxide (containing ethyl cellosolve and titanium oxide in a ratio of 5:1) which was subjected to dispersion treatment by a bead mill were blended to prepare the chromium-free rust-inhibitive surface treatment agent of COMPARATIVE EXAMPLE 1 having the formulation composition shown in Table 3. The total content of silicon in the chromium-free rust-inhibitive surface treatment agent solution was 10.6 weight % when silicon was converted to $SiO_2$. Next, the chromium-free rust-inhibitive surface treatment agent was applied onto the surfaces of five M8 bolts galvanized in a zincate bath by a dip and spin coating method, dried and then baked while maintained at 100° C. for 15 minutes in the same manner as in EXAMPLE 1. The crazing resistance and the rust-inhibitive performance were examined for these bolts in the same manner as in EXAMPLE 1, and as a result, slight crazing was observed in the rust-inhibitive coated film of the rust-inhibitive surface treatment agent after baking, and the bolts were placed in a salt spray tester for 24 hours, and then taken out and dried, and it was observed that crazing occurred in the rust-inhibitive coated film on the surfaces of the dried bolts. In addition, as shown in Table 3, the rust-inhibitive performance evaluated in a salt spray test was inferior to that of the bolt coated with each of the rust-inhibitive surface treatment agents of EXAMPLES 1 to 19.

Comparative Example 2

The alkoxysilane oligomer solution G containing no titanium component was used, and the alkoxysilane oligomer solution G was diluted by adding isopropyl alcohol, and the chromium-free rust-inhibitive surface treatment agent of COMPARATIVE EXAMPLE 2 having the formulation composition shown in Table 3 was prepared. The total content of silicon in the chromium-free rust-inhibitive surface treatment agent solution was 10.8 weight % when silicon was converted to $SiO_2$.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, the results substantially similar to those of COMPARATIVE EXAMPLE 1 were obtained as shown in Table 3.

Comparative Example 3

Into 45.9 parts by weight of the alkoxysilane oligomer solution H, 8.8 parts by weight of a zirconium chelate compound obtained by reacting 1 mol of zirconium tetra-n-propoxide with 2 mols of 2-ethyl hexanoic acid (ZA-40) produced by Matsumoto Fine Chemical Co., Ltd., a 10 weight % ethyl cellosolve solution of polyvinylbutyral, a 0.6 weight % isopropyl alcohol solution of boric acid, isopropyl alcohol, PGME and ETB were mixed to prepare the chromium-free rust-inhibitive surface treatment agent of COMPARATIVE EXAMPLE 3 having the formulation composition shown in Table 3. The total content of silicon and zirconium in the chromium-free rust-inhibitive surface treatment agent solution was 11.2 weight % when silicon and zirconium were converted to $SiO_2$ and $ZrO_2$, respectively, and the content ratio of zirconium to the total amount of silicon and zirconium was 8.9 atomic %.

Next, the chromium-free rust-inhibitive surface treatment agent was applied onto five M8 bolts galvanized in a zincate bath by a dip and spin coating method, dried and then baked while maintained at 100° C. for 20 minutes. The crazing resistance and the rust-inhibitive performance were examined for these bolts in the same manner as in EXAMPLE 1, and as a result, slight crazing occurred and the rust-inhibitive performance was relatively good as shown in Table 3, but was slightly inferior to that of the bolt coated with the chromium-free rust-inhibitive surface treatment agent of EXAMPLE 16 containing a titanium chelate compound blended therein. In addition, since zirconium chelate compounds are expensive compounds as compared with titanium chelate compounds, they are not practical for use due to high surface treatment cost.

TABLE 3

| Components in Chromium-free Rust-inhibitive Surface Treatment Agent | COMPARATIVE EXAMPLE (Composition in weight parts) | | |
|---|---|---|---|
| | 1 | 2 | 3 |
| Alkoxysilane oligomer solution | G | G | H |
| | 65.0 | 65.0 | 45.9 |
| Polyvinyl butyral resin solution | 5.0 | | 2.6 |
| 0.6 wt % boric acid solution | | | 4.4 |
| Alcohol solvent | | | |
| Isopropyl alcohol | 35 | 55 | 30.3 |
| High-boiling point alcohol | | | |
| PGME | | | 9 |
| Ethyl Cellosolve | 5 | | |
| ETB | | | 14 |
| Silane coupling agent | | | |
| γ-methacryloxypropyl trimethoxysilane (SH6040) | 5.0 | | |
| Zirconium Chelate compound | | | 8.8 |
| Titanium dioxide slurry | 8.0 | | |
| Total weight parts | 123 | 120 | 115 |
| Zr/(Zr + Si) (atomic %) | | | 8.9 |
| Content (wt %) converted to $SiO_2$ + $ZrO_2$ | 10.6 | 10.8 | 11.2 |
| Appearance of crazes | | | |
| After coated and baked | A little | A little | No |
| After 24 hours of salt spray test | Yes | Yes | A little bit |
| Result of Salt spray test | | | |
| White rust (hours) | 144 | 120 | 192 |
| Red rust (hours) | 1080 | 1032 | 1104 |

Titanium dioxide slurry: Dispersion-treated slurry containing 16.7 weight % titanium dioxide fine powder dispersed in Ethyl Cellosolve. (Super titania F-6 available from Showa Denko K.K. was used as titanium dioxide fine powder.)
Zirconium Chelate compound: Formed by reacting of 1 mol of zirconium tetra n-propoxide with 2 mols of 2-ethylhexanoic acid. The liquid containing 30 weight % of zirconium is available from Matsumoto Fine Chemical Co., Ltd.

The invention claimed is:

1. A chromium-free rust-inhibitive surface treatment agent for metal parts with zinc surfaces consisting of an alcoholic solution of alkoxysilane oligomer having weight-averaged molecular weight of 1,000 to 10,000,
   wherein silicon atoms in molecules of the alkoxysilane oligomer are partly replaced with titanium atoms from an organic chelate titanium compound, the alcoholic solution contains titanium of 2.5 to 15 atomic % to a total amount of silicon and titanium, and the total amount of silicon and titanium is 5 to 20 weight % in the alcoholic solution when silicon and titanium are converted to $SiO_2$ and $TiO_2$, respectively, wherein the alcoholic solution of alkoxysilane oligomer is prepared by adding an acid catalyst and water to an alcoholic solution containing alkoxysilane raw material to hydrolyze and condensation-polymerize the alkoxysilane raw material to synthesize alkoxysilane oligomer, and mixing an organic chelate titanium compound with an alcoholic solution of the synthesized alkoxysilane oligomer, wherein the organic chelate titanium compound is titanium alkoxide in which 40 to 60% of alkoxy groups are blocked or replaced by octyleneglycol as a chelating agent.

2. A chromium-free rust-inhibitive surface treatment agent for metal parts with zinc surfaces as set forth in claim 1, wherein the alkoxysilane raw material consists of 90 to 99 mol % of tetraalkoxysilane monomer or alkoxysilane oligomer, which oligomer has weight-averaged molecular weight less than 800, and the balance being alkylalkoxysilane monomer.

3. A chromium-free rust-inhibitive surface treatment agent for metal parts with zinc surfaces as set forth in claim 2, wherein the alkylalkoxysilane monomer is at least one selected from the group consisting of methyltrimethoxysilane, methyltriethoxysilane, ethyltrimethoxysilane, vinyltrimethoxysilane and γ-methacryloxypropyltrimethoxysilane.

4. A chromium-free rust-inhibitive surface treatment agent for metal parts with zinc surfaces as set forth in claim 1, wherein the alcoholic solution of alkoxysilane oligomer contains 0.1 to 2 weight % of alcohol-soluble resin.

5. A chromium-free rust-inhibitive surface treatment agent for metal parts with zinc surfaces as set forth in claim 4, wherein the alcohol-soluble resin is polyvinyl butyral resin.

6. A chromium-free rust-inhibitive surface treatment agent for metal parts with zinc surfaces as set forth in claim 5, wherein the alcoholic solution of alkoxysilane oligomer contains 0.004 to 0.10 weight % of boric acid.

7. A chromium-free rust-inhibitive surface treatment agent for metal parts with zinc surfaces as set forth in claim 1, wherein 20 to 40 weight % of alcohol component in the alcoholic solution of alkoxysilane oligomer is alcohol or glycol ether having a boiling point of 97° C. or more.

8. A chromium-free rust-inhibitive surface treatment agent for metal parts with zinc surfaces as set forth in claim 7, wherein the alcohol or the glycol ether having a boiling point of 97° C. or more is at least one selected from the group consisting of n-propyl alcohol, n-butyl alcohol, propylene glycol monomethyl ether, ethylene glycol monoethyl ether and ethylene glycol monobutyl ether.

9. A metal part with zinc surfaces coated with a siliceous film of 0.5 to 3 μm in average thickness formed by the chromium-free rust-inhibitive surface treatment agent defined in claim 1.

10. A metal part with zinc surfaces as set forth in claim 9, wherein the siliceous film is coated by a dip and spin coating method.

11. A metal part with zinc surfaces as set forth in claim 9, wherein the siliceous film is baked at a temperature of 120° C. or less.

* * * * *